US008036236B2

(12) United States Patent
Ackerman et al.

(10) Patent No.: US 8,036,236 B2
(45) Date of Patent: Oct. 11, 2011

(54) GATEWAY FOR USE IN AN ELECTRONIC COMMUNICATIONS RECORDING SYSTEM

(75) Inventors: Marthinus Casper Ackerman, Somerset West (ZA); Grant Alan Broomhall, Western Cape (ZA); Frederik Grobler, Somerset West (ZA)

(73) Assignee: Vastech SA (PTY) Limited, Pretoria (ZA)

( * ) Notice: Subject to any disclaimer, the term of this patent is extended or adjusted under 35 U.S.C. 154(b) by 0 days.

(21) Appl. No.: 12/308,940

(22) PCT Filed: Jul. 4, 2007

(86) PCT No.: PCT/IB2007/052619
§ 371 (c)(1),
(2), (4) Date: Jun. 16, 2009

(87) PCT Pub. No.: WO2008/004196
PCT Pub. Date: Jan. 10, 2008

(65) Prior Publication Data
US 2009/0304012 A1 Dec. 10, 2009

(30) Foreign Application Priority Data

Jul. 4, 2006 (ZA) .............................. 2006/05515
Jan. 25, 2007 (WO) ................. PCT/IB2007/050255

(51) Int. Cl.
*H04L 12/56* (2006.01)
(52) U.S. Cl. ..................................................... 370/401
(58) Field of Classification Search .................. 370/328, 370/335, 372, 375–376, 395.5–395.53, 400–401, 370/466, 472–477
See application file for complete search history.

(56) References Cited

U.S. PATENT DOCUMENTS

| | | | |
|---|---|---|---|
| 6,459,708 B1 * | 10/2002 | Cox et al. ...................... | 370/537 |
| 6,731,649 B1 * | 5/2004 | Silverman ...................... | 370/466 |
| 6,781,983 B1 * | 8/2004 | Armistead ..................... | 370/353 |
| 6,954,463 B1 * | 10/2005 | Ma et al. ........................ | 370/401 |
| 6,963,561 B1 * | 11/2005 | Lahat ............................. | 370/356 |
| 7,016,340 B1 * | 3/2006 | McKinion ..................... | 370/352 |
| 7,054,273 B1 | 5/2006 | Scholtens et al. | |
| 7,289,538 B1 * | 10/2007 | Paradise et al. ............... | 370/497 |
| 2003/0219029 A1 | 11/2003 | Pickett | |

OTHER PUBLICATIONS

International Search Report for PCT/IB2007/052619, mailed Jan. 14, 2008.

* cited by examiner

*Primary Examiner* — Frank Duong
(74) *Attorney, Agent, or Firm* — Nixon & Vanderhye PC

(57) ABSTRACT

A media gateway (34.2) comprises a line interface (54) comprising at least one input port, which is connectable to a time division multiplex (TDM) communications carrier. The at least one input port being configured to receive input data in at least one of a) clear channel data in a data carrier type and b) TDM framed in a primary rate carrier. The gateway comprises an extractor (66) for extracting the clear channel data and a formatter (64) for formatting the framed data. The gateway further comprises an interface (67) for making the extracted data and/or formatted data available as packet data network (PDN) data at a PDN output port of the gateway.

8 Claims, 10 Drawing Sheets

| SDH VC | PDH type |
|---|---|
| VC-4 | E4 |
| VC-3 | E3/T3 (DS3) |
| VC-2 | T2 |
| VC-12 | E1 |
| VC-11 | T1 |

GATEWAY FOR USE IN AN ELECTRONIC COMMUNICATIONS RECORDING SYSTEM

This application is the U.S. national phase of International Application No. PCT/IB2007/052619, filed 4 Jul. 2007, which designated the U.S. and claims priority to South African Application No. 2006/05515, filed 4 Jul. 2006 and PCT/IB2007/050255, filed 25 Jan. 2007, the entire contents of each of which are hereby incorporated by reference.

INTRODUCTION AND BACKGROUND

This invention relates to a media gateway and more particularly to a gateway for use in an electronic communications recording system.

Electronic communications recording systems are known and are typically used for surveillance by intelligence services and law enforcement agencies and more particularly to intercept, monitor and electronically record data relating to communications events associated with target data or numbers on intercepted communication networks. A target number may be a telephone number, internet protocol (IP) address, URL etc. There is also a growing need for commercial communications recording systems in communications carrier networks and by service providers.

Media gateways are also well known and in general serve the purpose of converting or translating data carried according to a first protocol in a first network to a second different protocol, typically to be transmitted in a second network according to the second protocol.

One presently known gateway is one configured to receive time division multiplexed (TDM) channels in a data carrier type, such as the known E1, T1 and J1 carrier types or higher order carrier types in the relevant hierarchies, and to demultiplex beyond the carrier type level to channel level, thereby to make selected channel data available on a local area network (LAN) to a host device, such as a VoIP telephone device connected to the LAN.

Such a gateway is not suitable in recording systems of the aforementioned kind, wherein large amounts of communications related data are required to be processed.

OBJECT OF THE INVENTION

Accordingly, it is an object of the present invention to provide an alternative gateway and method of making TDM data available to a LAN with which the applicant believes the aforementioned disadvantages may at least be alleviated.

SUMMARY OF THE INVENTION

According to the invention there is provided a media gateway comprising:
  a line interface comprising at least one input port which is connectable to a time division multiplex (TDM) communications carrier;
  the at least one input port being configured to receive input data in at least one of a) clear channel data in a data carrier type and b) TDM framed in a primary rate carrier;
  an extractor for extracting the clear channel data;
  a formatter for formatting the framed data; and
  an interface for making the extracted data or formatted data available as packet data network (PDN) data at a PDN output port of the gateway.
In this specification the term "communications carrier" or "communication medium" includes within its scope, but is not limited to a physical conductor, fiber optic cable, wireless link, etc.

A "carrier protocol type" or "data carrier type" includes within its scope, but is not limited to a digital transmission format such as the formats in the Plesiochronous Digital Hierarchy (PDH), for example the E-carrier system (for example E1 . . . E5), the formats in the T-carrier system (for example T1 . . . ), DS0 multiples, Synchronous Digital Hierarchy (SDH), SONET, etc. Each carrier protocol type may support one or more signaling protocol, such as SS7 and SS5.

The term "primary rate carrier" is used to denote the lowest capacity data carrier type in terms of bit rate in the relevant system or hierarchy, for example E1 in the case of the E-carrier system, T1 in the T-carrier system and J1 in the J-carrier system.

The media gateway may comprise 128 inputs each configured to receive input data as one of clear channel data in a data carrier type and TDM data framed in the primary rate data carrier type, the extractor, in use, being operative to extract the clear channel data and the formatter, in use, being operative to format the framed data.

At least one of said at least one input port may be configured also to receive input TDM channel data in multiplexed form of at least one primary rate carrier encapsulated in a higher order data carrier type, the gateway may comprise a demultiplexer for demultiplexing encapsulated input data to a level of the primary rate carrier and not there-beyond to channel level, and the formatter may be configured to format the demultiplexed data.

The media gateway may comprise at least first, second, third and fourth inputs, one input may be configured to receive input data as clear channel data in a data carrier type, at least one other input may be configured to receive input TDM channel data in multiplexed form of at least one primary rate carrier in a higher order data carrier type, the extractor, in use, being operative to extract the clear channel data and the demultiplexer, in use, being operative to demultiplex the encapsulated data to the level of the primary rate carrier and not there-beyond.

According to another aspect of the invention there is provided a method of making an input data stream on a time division multiplex (TDM) communications carrier available to a local area network, the method comprising the steps of:
  receiving the stream at a port of a gateway;
  if the data is clear channel data, extracting the data; and
  if the data is encapsulated in a multiplexed form of at least one primary rate carrier, demultiplexing the data to the level of the primary rate carrier and not there-beyond to channel level, and formatting the demultiplexed data; and
  making the extracted and/or formatted data available as PDN data at a PDN output port of the gateway.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
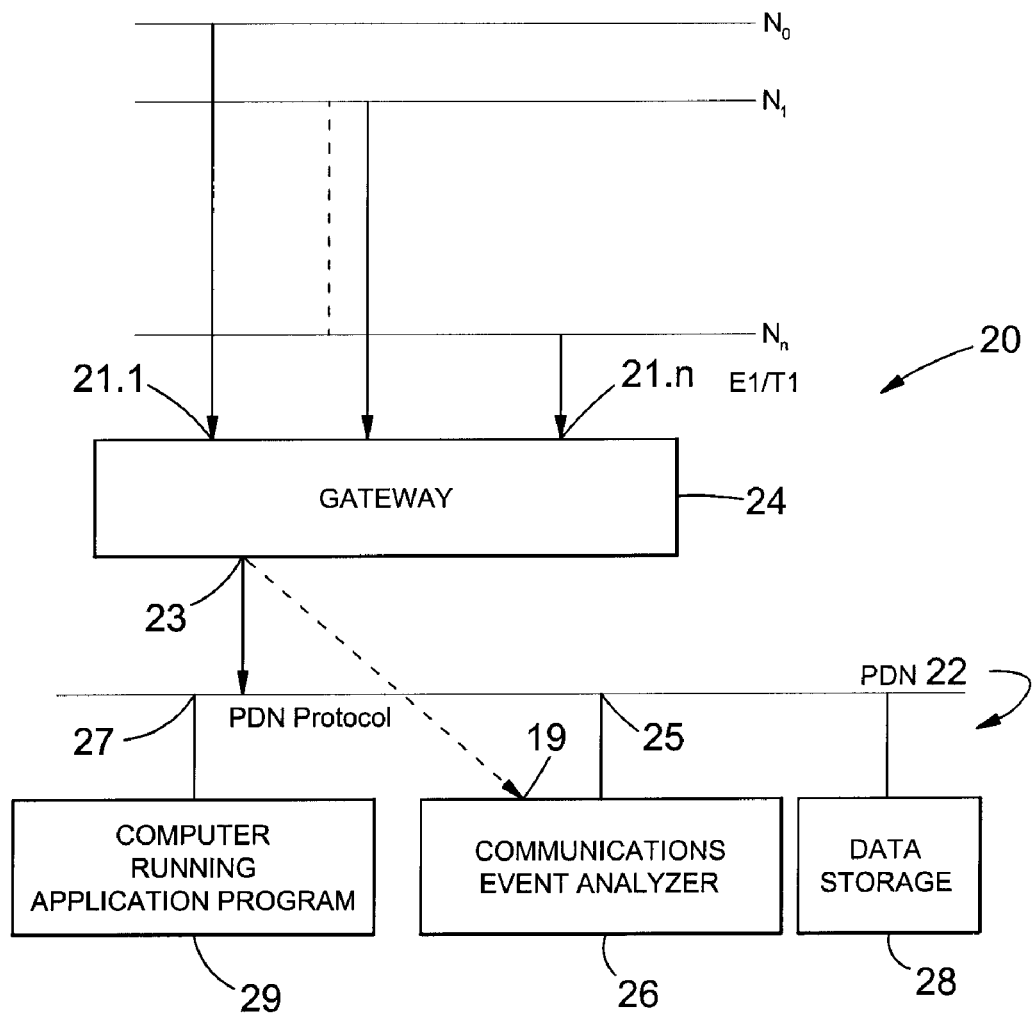
FIG. 1 is a high level block diagram of an electronic communications recording system comprising a me gateway according to the invention.

An electronic communications event recording system comprising a media gateway 24 according to the invention is generally designated by the reference numeral 20 in FIG. 1.

The system 20 is connectable to at least one communications carrier or medium $N_0$ to $N_n$, of any suitable type, carrying data relating to a plurality of communications events according to a respective carrier protocol type. The system 20 comprises an internal or local packet data network (PDN) 22 configured to support a PDN protocol and at least one gateway 24 comprising at least one gateway input port 21.1 to 21.n connected to a respective one of said at least one communications carrier and at least one PDN output port 23 connected to the PDN. The gateway is configured to translate data at said at least one gateway input port from the respective carrier protocol type to the PDN protocol, which is different from the respective carrier protocol type. The system further comprises at least one communications event processor in the form of a communications event analyzer 26 connected to the PDN and configured to receive as addressed destination, typically as a service access point 19 on the PDN, translated PDN data associated with at least one predetermined port 21.1 to 21.n, to process the received PDN data and to extract from the received PDN data, communications event data relating to at least one communications event. The system further comprises data storage means 28 connected to the PDN, for storing the extracted communications event data.

The PDN preferably comprises a switched Ethernet and the PDN protocol is preferably the known Transmission Control Protocol/Internet Protocol stack (TCP/IP), which is asynchronous. The gateway 24 comprises internal buffers (which will be described in more detail hereinafter) for received data and which buffers are configured to optimize Ethernet throughput according to various parameters.

The PDN data is sent to the communications event analyzer 26 in an addressed PDN IP packet. The IP packet preferably comprises address data comprising an address pair comprising a network address and a transport address relating to service access point 19, which is accessible by the communications event analyzer. Hence, data at predetermined ports 21.1 to 21.n intended for the analyzer 26 are addressed to the service access point 19 and automatically forwarded by the gateway via the PDN to the analyser 26. Accordingly, the communications event analyzer is not required to 'sniff' amongst other data on the PDN for the data that it requires.

Figure 2:
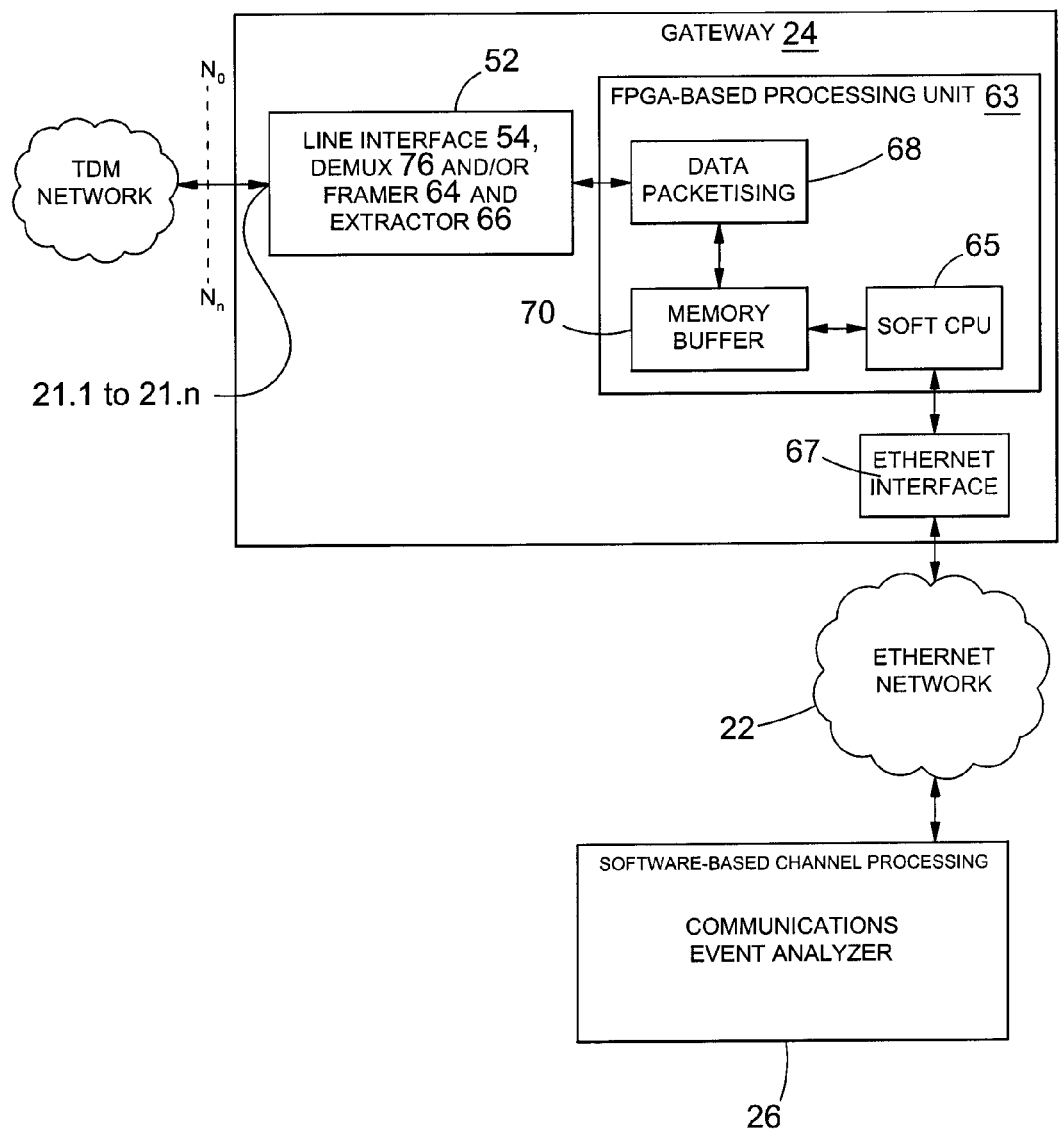
FIG. 2 is a more detailed diagram of the recording system and the gateway according to the invention.

Referring to FIG. 2, the gateway 24 comprises a hardware arrangement 52 comprising a line interface 54 providing the input ports 21.1 to 21.n, demultiplexer 76 for demultiplexing an incoming data stream as will hereinafter described and/or primary rate carrier framing means 64 and bit stream extraction means 66. In one embodiment, outputs of the hardware arrangement 52 are connected to a field programmable gate array (FPGA) 63 comprising data aggregation and packetising means 68, with associated buffers 70 and a controller 65. The FPGA 63 is connected to a PDN interface 67 having an output connectable to the PDN 22.

Figure 4:
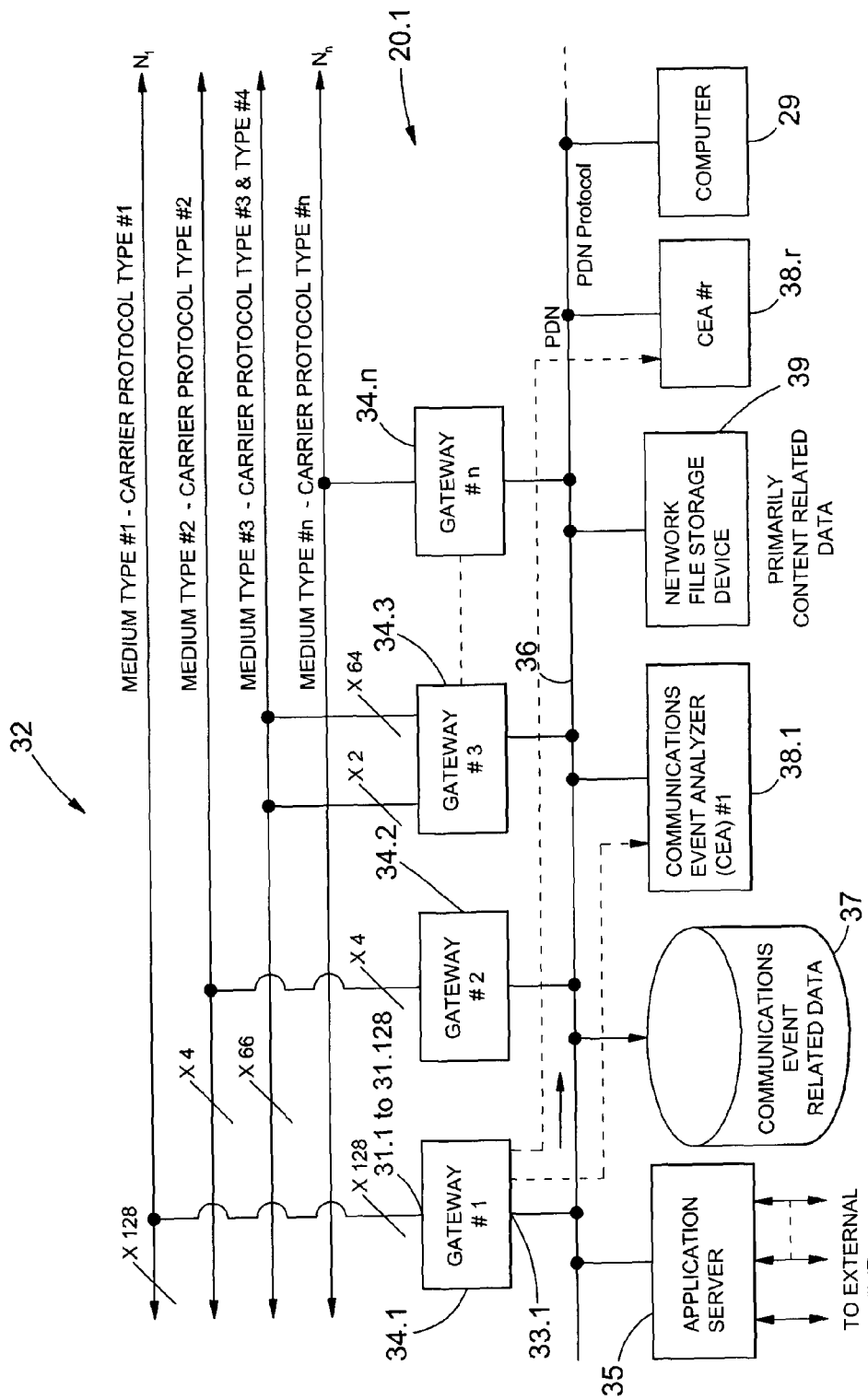
FIG. 4 is a block diagram of another embodiment of the recording system comprising a plurality of gateways of different types.

In FIG. 4, there is shown a more detailed block diagram of one embodiment 20.1 of the recording system. The system 20.1 is connectable to a plurality $N_1$ to $N_n$ of communications carriers 32 of external networks to be monitored, comprising communications carriers of any suitable type, such as physical conductors, optical fiber, wireless link etc and carrying data relating to a plurality of communications events according to a respective carrier protocol type. The system comprises a plurality of gateways 34.1 to 34.n according to the invention connected to the external networks. Each gateway comprises a plurality of input ports 31.1 to 31.128 (in the case of gateway 34.1) connected to respective ones of the communications carriers, and respective outputs 33.1 connected to the PDN. Also connected to the PDN is at least one communications event analyzer 38.1 to 38.r.

Figure 3:
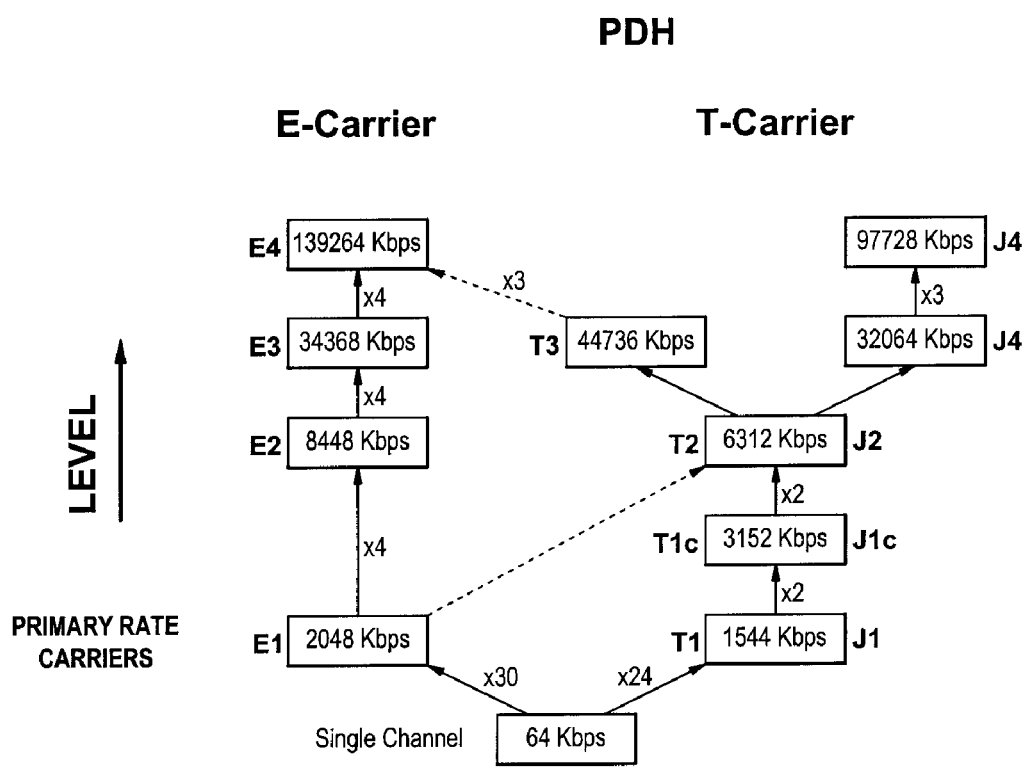
FIG. 3 is a diagram illustrating the PDH hierarchy and relationship between carrier formats in the E-carrier system, the T-carrier system and J-carrier system.

In FIG. 3 there is shown a self-explanatory diagram of the relationship between various data carrier types in the known E-carrier system, the T-Carrier system and DS3. The capacity in kbits/sec of the formats increases from the bottom to the top. Four E1 primary rate carriers may be multiplexed into or encapsulated in one E2 data carrier type. Four E2 data carrier types may be multiplexed into or encapsulated in one E3 data carrier type and sixteen E1 primary rate carriers may be multiplexed into or encapsulated in one E3 data carrier type.

As stated hereinbefore, the gateway is configured to translate data at said input ports from the respective carrier protocol type to the PDN protocol. In the event of higher order carrier types (such as E3) encapsulating multiplexed lower order carrier types (such as E1), the higher order carrier types are de-multiplexed to primary rate carrier level, E1, and not there-beyond, or a clear channel intermediate order carrier type, such as E2. Accordingly, different types of gateways are available. The following merely represent examples of gateway types:

- a first gateway type which supports 128 TDM carriers which could be configured to be of a first carrier protocol type, such as E1 or T1. Gateway #1 designated 34.1 in FIG. 4 may be of this type;
- a second gateway type which supports 4 TDM carriers which could be configured to support a second carrier protocol type such as E3 or DS3. Gateway #2 designated 34.2 in FIG. 4 may be of this type;
- a third gateway type which supports at least one external Ethernet port, which is connectable to external Ethernet networks at 10 or 100 or 1000 or 10 000 Mbits;
- a fourth gateway type which supports one or more Synchronous Digital Hierarchy (SDH) protocol ports which are connectable to the external networks, such as Synchronous Transmission Module (STM), such as STM-1 and STM-4;
- a fifth type which supports one or more SONET protocol ports which are connectable to the external networks, such as OC-3; and
- a hybrid type which supports at least third and fourth carrier protocol types. The third and fourth carrier protocol types are preferably different from one another. The third carrier protocol type may be the same as the first, the fourth carrier protocol type may be the same as the second and the third Gateway #3 designated 34.3 in FIG. 4, may be of this type. In other embodiments, the third and fourth carrier protocol types are different from both the first and second carrier protocol types.

Figure 5:
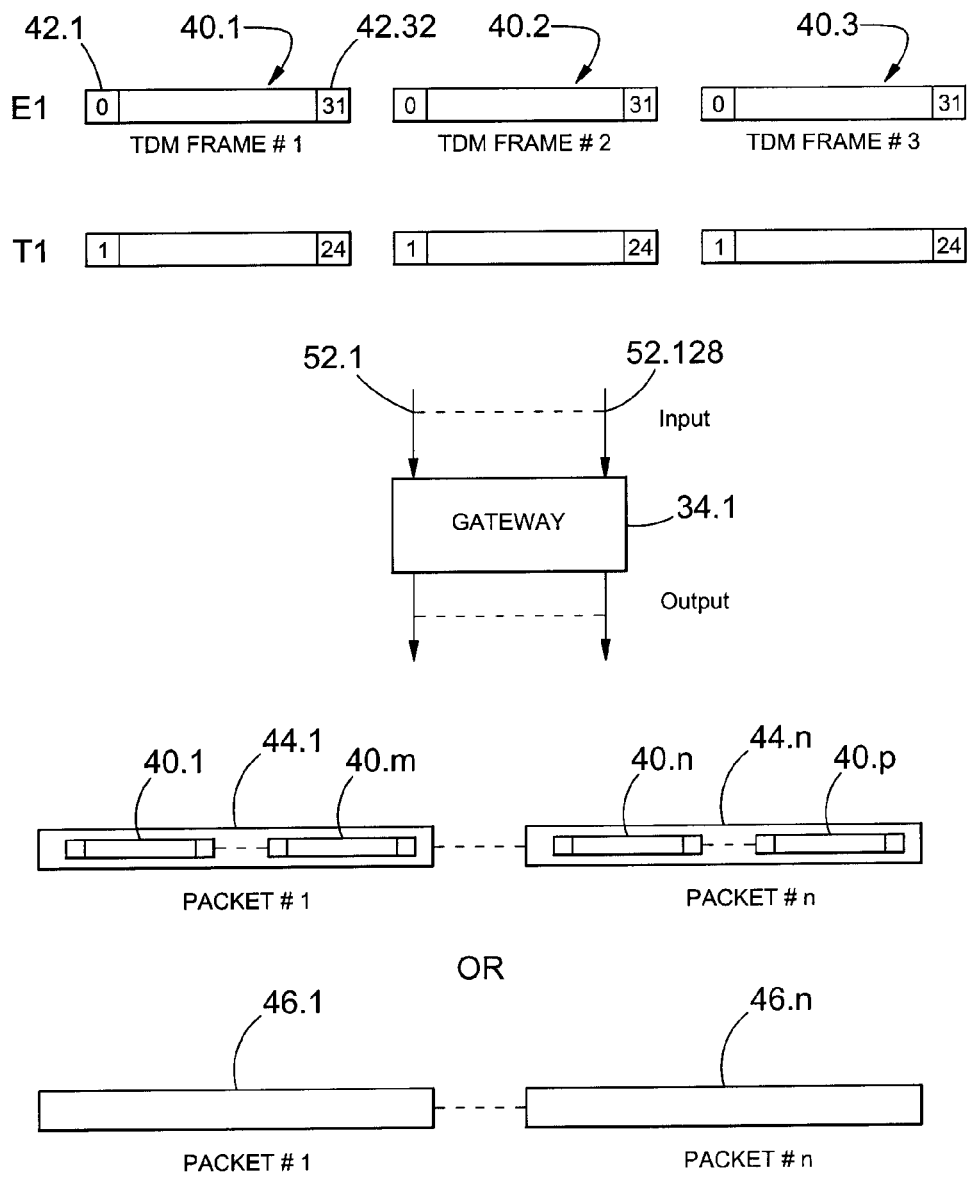
FIG. 5 is a diagrammatic illustration of the translation function of a first embodiment of the gateway.

Referring to FIG. 5, and also by way of example, the function of a gateway 34.1 of the aforementioned first type is to translate clear channel or framed TDM data on the input side of the gateway to the packets of the TCP/IP protocol on the PDN or output side of the gateway 34.1. In the figure, there are shown E1 frames 40.1 to 40.3 comprising 32 timeslots 42.1 to 42.32 each. Similarly, the T1 frames comprise 24 timeslots each. The resulting asynchronous PDN packets 44.1 to 44.n each comprises a plurality of TDM frames, or, as shown in the case of packets 46.1 to 46.n, clear channel data. The gateway 34.1 receives the E1 and/or T1 frames on a plurality of E1/T1 ports 52.1 to 52.128. The gateway then aggregates the frames of each port separately into respective buffers (not shown in FIG. 3) and which buffers are configured to provide acceptable use of the PDN frame size and acceptable latency in the transfer of data between the E1/T1 side and the PDN side.

The function of the aforementioned second type of gateway 34.2 is to translate between the clear channel or TDM-framed protocol on the E3 and/or DS3 external network side of the gateway and the asynchronous PDN protocol. Translated clear channel E3 and DS3 are addressed as aforesaid to respective separate service access points on the PDN accessible by the relevant communications event analyzer. Multiplexed or encapsulated E3 or DS3 are de-multiplexed down to primary rate carriers E1 or T1 or J1 and not there-beyond and then translated to the asynchronous PDN protocol. Each primary carrier format is associated with a separate service access point on the PDN and may be clear channel or TDM.

The hybrid gateway 34.3 in FIG. 4 supports 64 ports for the E1/T1 carrier protocol type and two ports for the E3/DS3 carrier protocol type. The hybrid gateway is configured to translate data from these two protocol types to PDN data and to forward the translated data as aforesaid to suitable service access points on the PDN.

Figure 6:
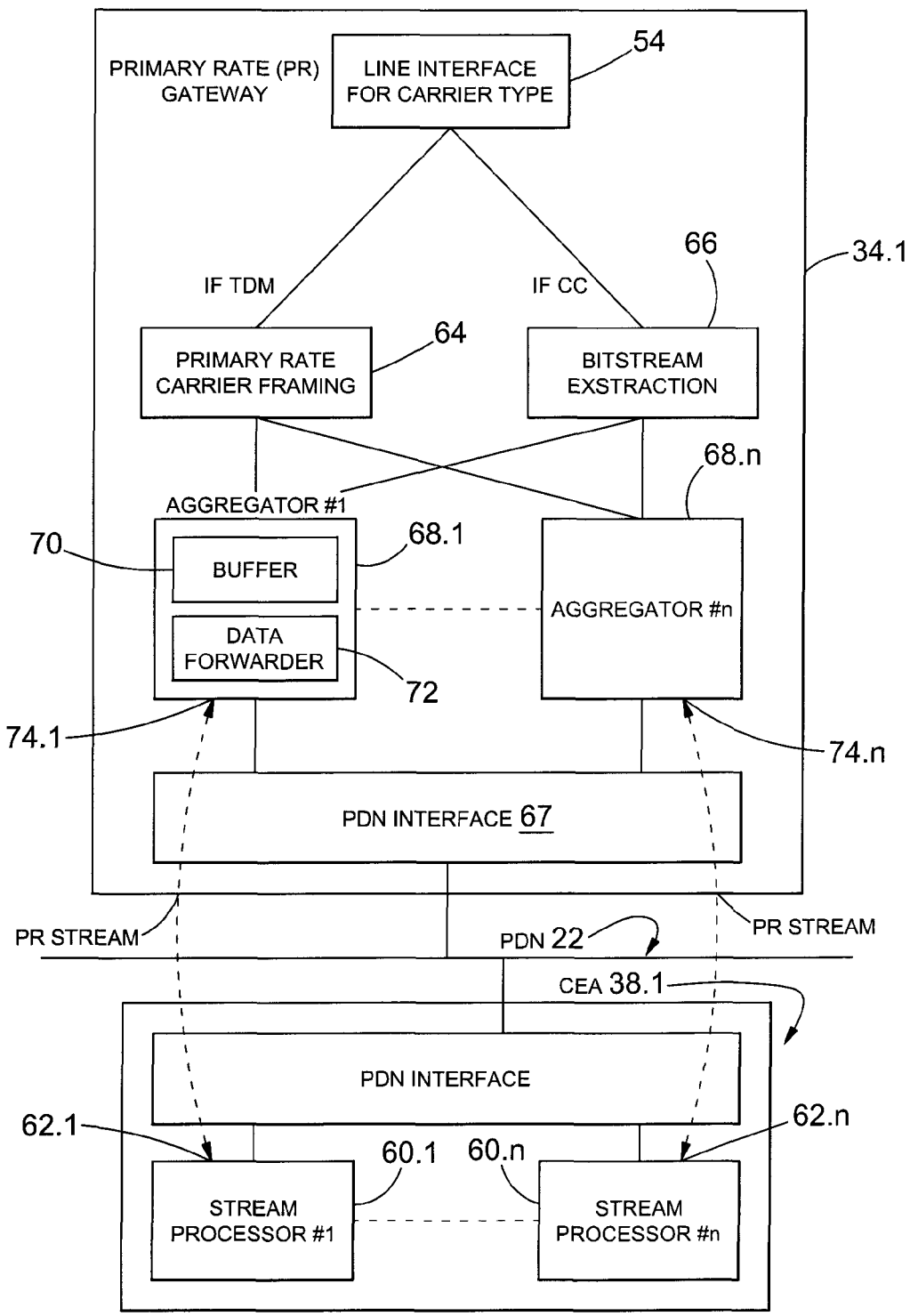
FIG. 6 is a more detailed block diagram of the first embodiment of the gateway.

In FIG. 6, there is shown a more detailed block diagram of a gateway 34.1 of the aforementioned first type connected to the PDN 22. Also connected to the PDN is a first communications event analyser 38.1 comprising a plurality of data stream processors 60.1 to 60.n, each associated with a respective service access point 62.1 to 62.n on the PDN. The gateway 34.1 comprises a primary rate carrier framer 64 and a bit stream extractor 66. The framer 64 and extractor 66 are connected to a plurality of data aggregators 68.1 to 68.n. Each aggregator comprises a buffer 70 as hereinbefore described and a data forwarder 72. The data forwarder 72 is configured to forward the data in the associated buffer 70 to a designated service access point 62.1 to 62.n associated with a data stream processor 60.1 to 60.n. Data transfer in the reverse direction is also possible in the same manner.

Figure 7:
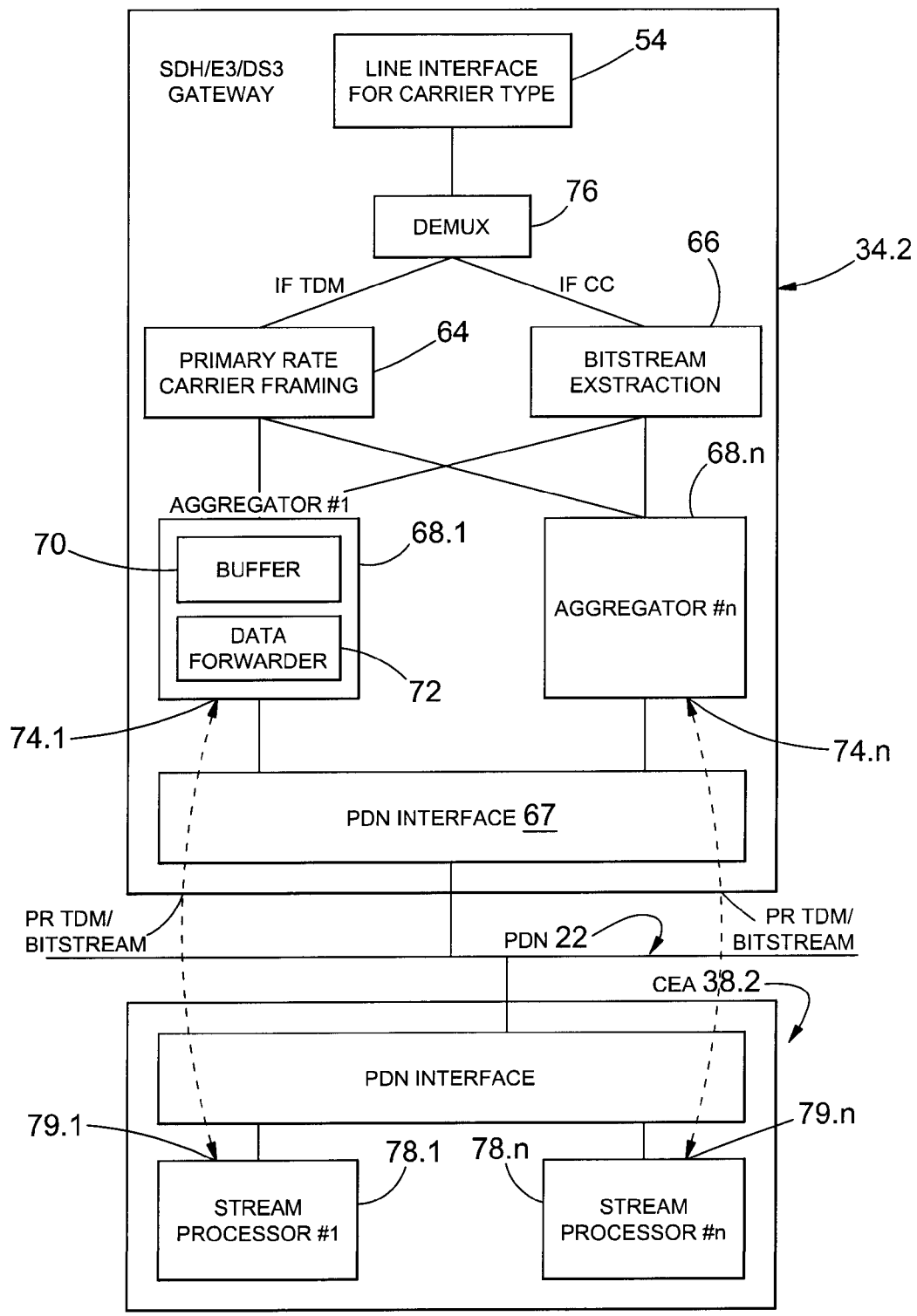
FIG. 7 is a similar diagram of a second embodiment of the gateway.

The gateway 34.2 shown in FIG. 7 differs from the gateway 34.1 in respect only of the de-multiplexer 76 which is operative to de-multiplex higher order carrier types into constituent primary rate carriers and not there-beyond, so that the data received by the data stream processors of the communication event analysers are either primary rate formatted, alternatively in a higher order carrier type, but clear channel.

Figure 10:
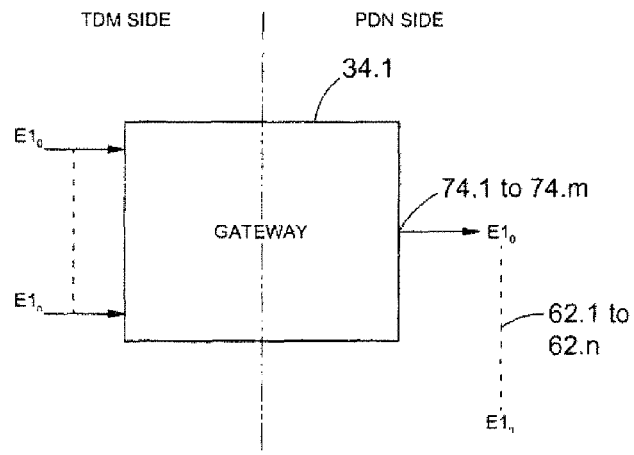
FIG. 10 is a diagram of input and output streams of the first embodiment of the gateway.

Another representation of the first gateway type 34.1 is shown in FIG. 10. The gateway 34.1 comprises n=128 inputs supporting 128 TDM carriers which could be configured to be of a first carrier protocol type or data carrier type, such as E1 or T1. The framed E1 data is primary rate carrier framed at 64 (shown in FIG. 6), aggregated, packetized at 70 and made available at the outputs 74.1 to 74.m to service access points 62.1 to 62.n (shown in FIGS. 6 and 10) as PDN data framed according to the E1 format.

Figure 11:
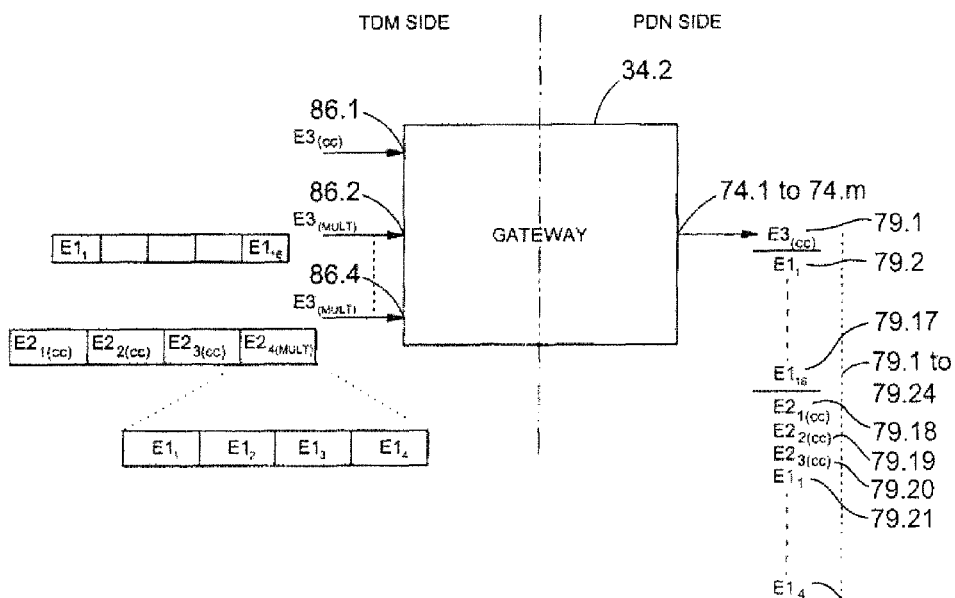
FIG. 11 is a similar diagram of the second embodiment of the gateway according to the invention.

Another representation of the second gateway type 34.2 is shown in FIG. 11. The gateway 34.2 supports 4 TDM carriers at ports 86.1 to 86.4 respectively, which could be configured to support a second data carrier type, such as E3 or DS3. The E3 carrier at port 86.1 may be clear channel. At the output, the gateway provides the clear channel data extracted by bit-stream extraction means 66, as PDN data. The E3 data carrier type at port 86.2 may encapsulate and comprise multiplexed incidents of primary rate carrier E1, namely $E1_1$ to $E1_{16}$. The gateway demultiplexes this multiplexed data to the level of the primary rate carrier, i.e. E1, and makes available at the output the PDN data framed as E1. The E3 data carrier type at the input 86.4 may comprise a first multiplexed or encapsulated combination comprising three E2 clear channel carriers plus a second encapsulation of four E1 primary rate carriers in a fourth E2 data carrier type. The gateway demultiplexes the data to the level of the three E2 clear channels and the E1 primary rate carriers respectively and the PDN data at the output comprises the $E2_{(cc)}$ and E1 data. The data is made available to twenty-four (24) service access points 79.1 to 79.24.

Figure 12:
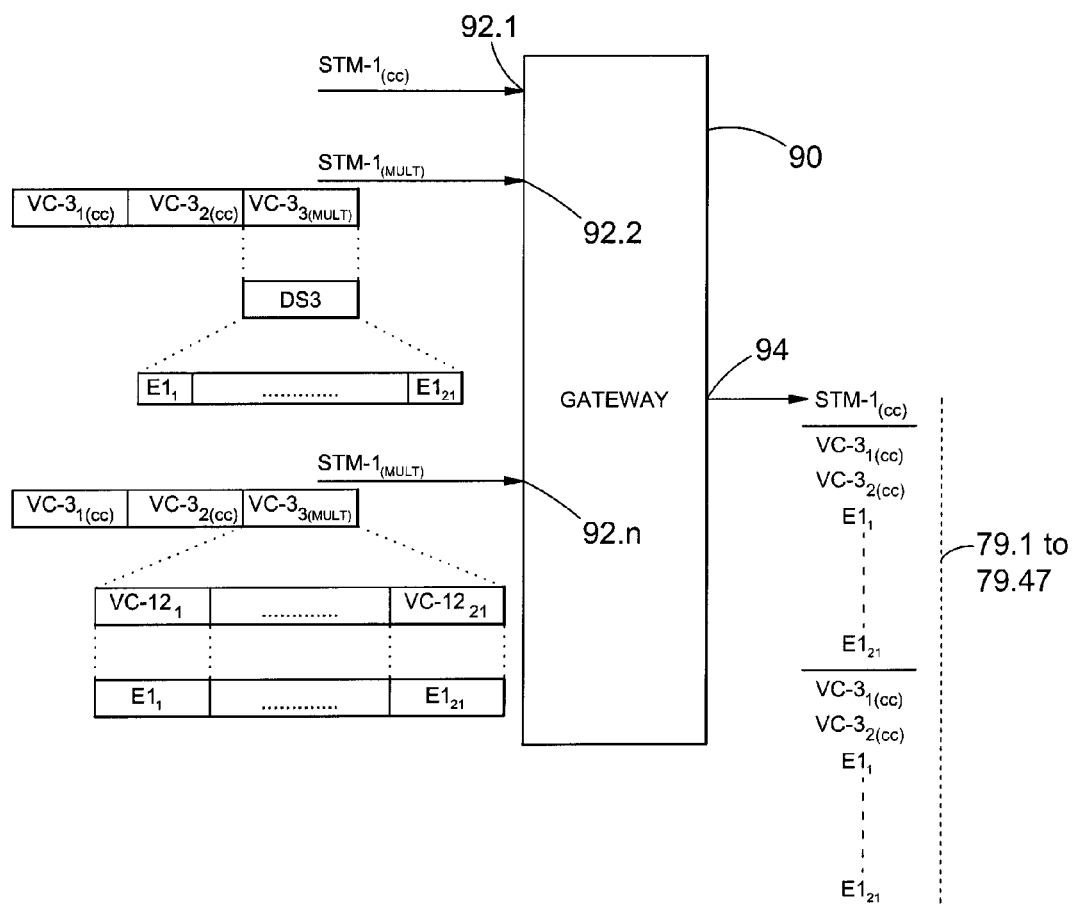
FIG. 12 is a similar diagram of a third embodiment of the gateway according to the invention.

Another gateway type 90 is shown in FIG. 12 and supports one or more Synchronous Digital Hierarchy (SDH) protocol ports 92.1 to 92.n, which are connectable to the external TDM networks, such as Synchronous Transmission Module (STM)-1. The SDH is shown diagrammatically in FIG. 8. The data at the port 92.1 may be clear channel data. The data at port 92.2 may comprise a multiplexed combination of three virtual containers $VC-3_1$ to $VC-3_3$. Virtual containers $VC-3_1$ and $VC-3_2$ may be clear channel and the virtual container $VC-3_3$ may comprise a multiplexed or encapsulated combination of twenty-one (21) primary rate carriers $E1_1$ to $E1_{21}$ in a DS3 data carrier type. The gateway provides at output 94 the extracted clear channel data of virtual containers $VC-3_1$ and $VC-3_2$ and the PDH hierarchy demultiplexed data in the third virtual container $VC-3_3$ framed as E1. Similarly, the data at port 92.n may comprise a multiplexed combination of three virtual containers $VC-3_1$ to $VC-3_3$.

Figures 8, 9:
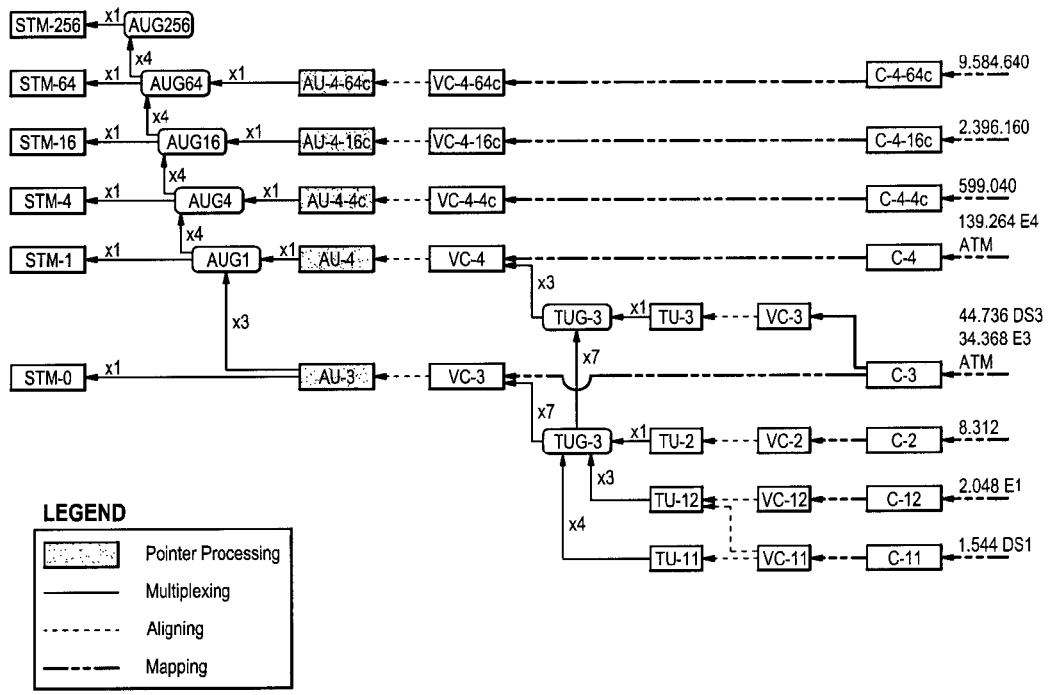
FIG. 8 is a diagram of the SDH.
FIG. 9 is a table illustrating mapping between the PDH and SDH.

The clear channel data in virtual containers $VC-3_1$ and $VC-3_2$ are treated as stated hereinbefore. Virtual container $VC-3_3$ may comprise a multiplexed or encapsulated combination of twenty-one (21) virtual containers $VC-12_1$ to $VC-12_{21}$ each comprising a respective primary rate PDH carrier $E1_1$ to $E1_{21}$. As shown in FIGS. 8 and 9 many of the virtual containers in the SDH match the bandwidth of the PDH. Hence, there is a direct mapping as shown in FIG. 9. The carrier types of the PDH may accordingly be carried in the SDH. The gateway provides at output 94 the extracted clear channel data of virtual containers $VC-3_1$ and $VC-3_2$ and the SDH demultiplexed data in the third virtual container $VC-3_3$ framed as E1. Hence, the data is made available to forty-seven (47) service access points 79.1 to 79.47.

In a presently preferred embodiment, little processing of the TDM data is done on the gateway. The gateway demultiplexes to the primary rate carrier format or clear channel, and not therebeyond. The extracted or framed data stream is packetised and made available in PDN format for processing by apparatus connected to the PDN.

The invention claimed is:
1. A media gateway for use in an electronic communication recording system, the media gateway comprising:

a line interface comprising at least one input port which is connectable to a time division multiplex ("TDM") communications carrier;

the at least one input port being configured to receive input data in at least one of a) clear channel data in a data carrier type and b) TDM framed data in a primary rate carrier;

an extractor for extracting the clear channel data;

a formatter for formatting the TDM framed data; and an interface for making the extracted data or formatted TDM framed data available as packet data network (PDN) data at a PDN output port of the gateway, with the extracted clear channel data addressed to a respective destination for each data carrier type carrying clear channel data; and the formatted TDM framed data addressed to a respective destination for each primary rate carrier.

2. The electronic communication recording system media gateway as claimed in claim 1, wherein the data carrier type is one of a primary rate carrier and any higher order carrier.

3. The electronic communication recording system media gateway as claimed in claim 1, wherein at least one input port is configured also to receive input TDM channel data in multiplexed form of at least one primary rate carrier encapsulated in a higher order data carrier type and wherein the gateway comprises a de-multiplexer for de-multiplexing encapsulated input data to a level of the primary rate carrier and not there-beyond to channel level, wherein the formatter is configured to format the de-multiplexed data, and wherein the formatted de-multiplexed primary rate carrier data is addressed to a respective destination for each primary rate carrier.

4. The electronic communication recording system media gateway as claimed in claim 1 comprising 128 inputs each configured to receive input data as one of clear channel data in a data carrier type and TDM data framed in the primary rate data carrier type, wherein the extractor, in use, is operative to extract the clear channel data and the formatter, in use, is operative to format the framed data.

5. The electronic communication recording system media gateway as claimed in claim 3 comprising at least first, second, third and fourth inputs, wherein one input is configured to receive input data as clear channel data in a data carrier type, wherein at least one other input is configured to receive input TDM channel data in multiplexed form of at least one primary rate carrier in a higher order data carrier type; wherein the extractor, in use, is operative to extract the clear channel data; and wherein the de-multiplexer, in use, is operative to de-multiplex the encapsulated data to the level of the primary rate carrier and not there-beyond.

6. A method of making an input data stream on at least one time division multiplex (TDM) communications carrier available to a local area network, the method comprising the steps of:

receiving the stream at a port of a gateway;

if the data is clear channel data, extracting the data; and if the data is encapsulated in a multiplexed form of at least one primary rate carrier, de-multiplexing the data to the level of the primary rate carrier and not there-beyond to channel level, and formatting the de-multiplexed data; and making the extracted and/or formatted data available as packet data network ("PDN") data at a PDN output port of the gateway with the extracted clear channel data addressed to a respective destination for each data carrier type carrying clear channel data; and the formatted TDM framed data addressed to a respective destination for each primary rate carrier.

7. A media gateway comprising:

a line interface comprising at least one input port which is connectable to a time division multiplex (TDM) communications carrier;

the at least one input port being configured to receive input data in at feast one of a) clear channel data in a data carrier type and b) TDM framed in a primary rate carrier;

an extractor for extracting the clear channel data;

a formatter for formatting the framed data;

an interface for making the extracted data or formatted data available as packet data network (PDN) data at a PDN output port of the gateway; and 128 inputs, each configured to receive input data as one of clear channel data in a data carrier type and TDM data framed in the primary rate data carrier type, wherein the extractor, in use, is operative to extract the clear channel data, and the formatter, in use, is operative to format the framed data.

8. A media gateway comprising:

a line interface comprising at least one input port which is connectable to a time division multiplex (TDM) communications carrier;

the at least one input port being configured to receive input data in at feast one of a) clear channel data in a data carrier type and b) TDM framed in a primary rate carrier;

an extractor for extracting the clear channel data;

a formatter for formatting the framed data;

an interface for making the extracted data or formatted data available as packet data network (PDN) data at a PDN output port of the gateway;

at least one input port being configured also to receive input TDM channel data in multiplexed form of at least one primary rate carrier encapsulated in a higher order data carrier type, and wherein the gateway comprises a de-multiplexer for de-multiplexing encapsulated input data to a level of the primary rate carrier and not there-beyond to channel level, and wherein the formatter is configured to format the de-multiplexed data; and at least first, second, third and fourth inputs, wherein one input is configured to receive input data as clear channel data in a data carrier type, wherein at least one other input is configured to receive input TDM channel data in multiplexed form of at least one primary rate carrier in a higher order data carrier type;

wherein the extractor, in use, is operative to extract the clear channel data; and wherein the de-multiplexer, in use, is operative to de-multiplex the encapsulated data to the level of the primary rate carrier and not there-beyond.

* * * * *